United States Patent [19]

Matschinsky

[11] Patent Number: 4,664,412
[45] Date of Patent: May 12, 1987

[54] WHEEL SUSPENSION FOR STEERABLE WHEELS, ESPECIALLY FRONT WHEELS, OF MOTOR VEHICLES

[75] Inventor: Wolfgang Matschinsky, Munich, Fed. Rep. of Germany

[73] Assignee: Bayerische Motoren Werke AG, Fed. Rep. of Germany

[21] Appl. No.: 828,506

[22] Filed: Feb. 12, 1986

[30] Foreign Application Priority Data

Feb. 28, 1985 [DE] Fed. Rep. of Germany ....... 3507141

[51] Int. Cl.⁴ .............................................. B60G 3/26
[52] U.S. Cl. .................................... 280/771; 280/94; 280/688; 280/701
[58] Field of Search .................. 280/771, 670, 93, 94, 280/96.1, 660, 666, 667, 670, 673, 675, 688, 690, 693, 695, 698, 701

[56] References Cited

U.S. PATENT DOCUMENTS

| 3,521,900 | 7/1970 | Sakai et al. | 280/94 |
| 4,245,853 | 1/1981 | Inoue | 280/701 |
| 4,257,623 | 3/1981 | Kawase | 280/701 |
| 4,556,235 | 12/1985 | Giebel | 280/701 |

FOREIGN PATENT DOCUMENTS

| 2332387 | 1/1975 | Fed. Rep. of Germany . |
| 2642939 | 3/1978 | Fed. Rep. of Germany . |
| 7905588 | 2/1979 | Fed. Rep. of Germany . |
| 3331282 | 3/1985 | Fed. Rep. of Germany . |
| 3331247 | 3/1985 | Fed. Rep. of Germany . |

Primary Examiner—Richard A. Bertsch
Attorney, Agent, or Firm—Barnes & Thornburg

[57] ABSTRACT

A wheel suspension for steerable wheels, especially front wheels of motor vehicles, with a wheel carrier supporting the wheel; an upper cross guide member and a tie rod displaceable in its longitudinal direction are pivotally connected at this wheel carrier. The lower cross guide member supporting the vehicle support spring is connected by way of a corner-rigid pivot joint with an intermediate member, at which in turn the wheel carrier is supported by way of a corner-rigid pivot bearing having approximately vertical axis and a possibility of displacement in the direction of this axis. The wheel carrier and the intermediate member are each pivotally connected with an approximately vertical tension rod. The tension rod is extended beyond its pivotal connection with the intermediate member. A strut extending obliquely to the vehicle longitudinal direction, as viewed in plan view, is pivotally connected with its one end at the thus formed extension while it is pivotally connected with its other end at the vehicle body. A far-reachingly translatory movement can be superimposed in this manner on the purely rotary movement of the wheel, from which results a center of rotation for the steering movement of the wheel which is displaced to the vehicle outside with respect to the real joint connections of the wheel carrier. Additionally drive and brake moments which are exerted on the wheel carrier, can be favorably introduced into the vehicle body by way of the strut in conjunction with a vertical support strut.

16 Claims, 4 Drawing Figures

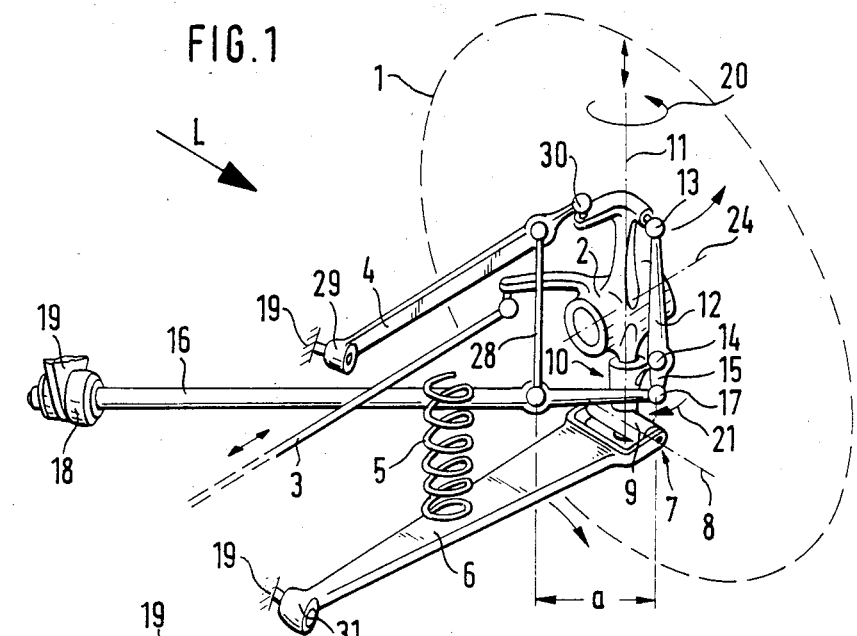
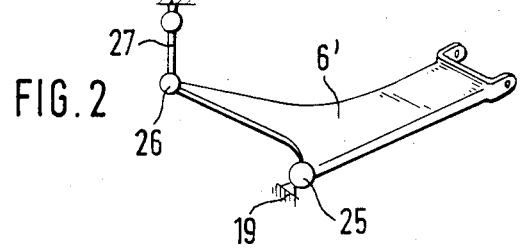
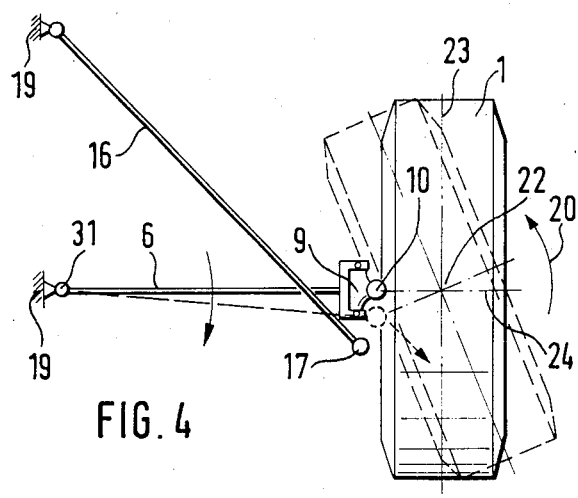
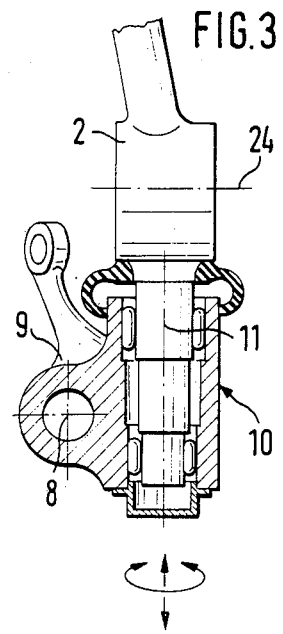

WHEEL SUSPENSION FOR STEERABLE WHEELS, ESPECIALLY FRONT WHEELS, OF MOTOR VEHICLES

The present invention relates to a wheel suspension for steerable wheels, especially front wheels, of motor vehicles with a wheel carrier supporting the wheel, in which a tie rod as well as an upper cross guide member are pivotally connected with the wheel carrier, in which a lower cross guide member supporting the support spring is pivotally connected with an intermediate member by way of a corner-rigid pivot joint having a pivot axis extending essentially longitudinally, in which the wheel carrier is supported at the intermediate member by way of a corner-rigid pivot bearing having an approximately vertical axis and a vertical displaceability, and in which the wheel carrier and the intermediate member are additionally pivotally connected with an approximately vertical tension rod.

A wheel suspension of this type is described in the German Patent Application No. P 33 31 282 which was not published at the time the Convention application was filed. In this wheel suspension the lower cross guide member is constructed torsion-rigid whereas the upper cross guide member is a simple rod guide member with a joint at each end. The brake and driving forces are introduced exclusively by way of the lower cross guide member into the vehicle body—possibly also into an auxiliary frame or the like. For reducing the elasto-kinematic effects of brake and drive forces, small steering roll radii and interference force lever arms, i.e. also small angles of steering axis inclination, are desired. However, these so-called "gravity caster action" or "weight returnability" of the steered wheels from the deflected position into the straight driving position became thereby also very small which, however, can be attained again satisfactorily with the support rod described in the aforementioned prior application.

In order not to have to limit excessively the installation space, in wheel suspensions for example, for the brakes, it is additionally known (DE-PS No. 19 38 850) to realize an ideal steering axis by dividing a cross guide member into two individual guide members.

It is the object of the present invention to provide a wheel suspension of the aforementioned type which permits a completely satisfactory design and construction of the elasto-kinematics for the load situations of braking, driving and lateral force, which additionally has a small angle of steering axis inclination with a small steering roll radius and with a small interference force lever arm and which offers an adequate installation space for the brake, whereby additionally a sufficient weight returnability or gravity caster action is to be assured notwithstanding the small steering axis inclination.

The underlying problems are solved according to the present invention with a wheel suspension of the aforementioned type of construction in that the tension rod or strut is extended beyond its pivotal connection with the intermediate member and an end of a strut extending obliquely to the vehicle longitudinal axis, as viewed in plan view, is pivotally connected at this extension, whereby the obliquely extending strut is pivotally connected with its other end at the vehicle body. The tension rod or strut effects, on the one hand, a good weight returnability or caster action in the manner described in the patent application No. P 33 31 282 with a small steering axis inclination. On the other hand, as a result of the pivoting of the tension rod or strut in the course of a steering deflection also the extension of the tension rod is displaced so that the structural group of intermediate member/wheel carrier also carries out a relative movement in the longitudinal direction of the strut during the deflection of the wheel. This relative movement in conjunction with the rotary movement of the wheel carrier with respect to the intermediate member leads to a rotation of the wheel about an ideal axis whereby the axis of rotation of the wheel is displaced from the real joints of the wheel carrier and intermediate member in the direction toward the vehicle outside. Consequently, similar as in the German Pat. No. 19 38 850, brakes with relatively large dimensions can be accommodated nonetheless in the wheel disk.

During the steering the wheel pivots about a center of rotation and with the tire contour approaches considerably less the obliquely extending strut. The strut, together with the lower cross guide member, is able to introduce brake and drive forces into the vehicle body or the like over a very large bearing base. These forces are thereby predominately introduced into the vehicle body by way of the strut which is preferably elastically yieldingly supported thereat. Such a bearing support enables, on the one hand, a very good "longitudinal spring action" of the entire wheel suspension whereby the wheel guide geometry is influenced little nonetheless during longitudinal spring movements by reason of the large bearing spacing.

In a particularly preferred embodiment, a support rod is additionally provided which, on the one hand, is pivotally connected with the upper cross guide member intermediate the pivotal connections thereof at both ends and, on the other hand, with the obliquely extending strut also intermediate the pivotal connections thereof at both ends. Furthermore, the lower cross guide member may thereby be appropriately a simple transversely directed guide arm which is connected with a vehicle body or the like (for example with an auxiliary frame) only by a single joint. Of course, the lower cross guide member cannot absorb thereby the torques resulting from the braking and the drive and introduce the same into the vehicle body. These moments are then introduced in the vehicle body by way of the obliquely extending strut, the support rod and the upper cross guide member. If, for example, with a driven, steerable front wheel, the obliquely extending strut is directed from the wheel obliquely rearwardly inwardly, then the strut can be pivotally connected in a relatively rigid zone of the body (underneath the engine space rear wall). The longitudinal forces and the vertical forces resulting from the driving moments and the brake moments, which occur at the rear joint end of the strut, are therefore absorbed by a particularly stable and rigid area of the body.

These and other objects, features and advantages of the present invention will become more apparent from the following description, when taken in conjunction with the accompanying drawings, which show, for purposes of illustration only, two embodiments in accordance with the present invention, and wherein:

FIG. 1 is a perspective view of a first embodiment of a wheel suspension in accordance with the present invention;

FIG. 2 is a corresponding perspective view of a modified embodiment of the lower cross guide member for a wheel suspension in accordance with the present invention;

FIG. 3 is a partial vertical cross sectional view through the intermediate member of the wheel suspension in accordance with the present invention, taken approximately in the vehicle longitudinal direction; and FIG. 4 is a partially schematic plan view on the embodiment of the wheel suspension according to FIG. 1.

Referring now to the drawing wherein like reference numerals are used throughout the various views to designate like parts, the various embodiments illustrated in the drawings relate to wheel suspensions of steerable front wheels 1 of a motor vehicle. However, the present invention would also be utilizable with motor vehicles having steerable rear wheels. A wheel carrier 2 supporting the wheel 1 is illustrated in FIG. 1, with which a steering tie rod 3 and an upper cross guide member 4 are pivotally connected. The lower cross guide member 6 which supports the vehicle support spring 5, is connected with an intermediate member 9 in the manner already described in the patent application No. P 33 31 282 by way of a corner-rigid pivot joint generally designated by reference numeral 7 having an essentially longitudinally extending axis of rotation 8. The wheel carrier 2, in its turn, is supported in the intermediate member 9 by way of a further corner-rigid pivot bearing generally designated by reference numeral 10 having an at least approximately vertical axis 11 and a vertical displacing possibility. The vertical displacing possibility is assured in the illustrated embodiment according to FIG. 3 by the use of two needle bearings. Finally the wheel carrier 2 and the intermediate member 9 are additionally pivotally connected with an approximately vertical tension rod 12. During rotation of the wheel carrier 2 about the axis 11, i.e. during the steering deflection of the wheel 1, the tension rod 12 effects a "pulling up" of the intermediate member 9 and therewith of the lower cross guide member 6. As a result thereof the front part of the motor vehicle is also lifted by way of the support spring 5. This is the reason for the good weight returnability or gravity caster action of the wheel suspension which effects an automatic pivoting back of the deflected wheel (after releasing the steering wheel) into the straight driving position.

The tension rod 12 is connected at its upper end by way of the joint 13 with the wheel carrier 2 and in its lower area by way of the joint 14 with the intermediate member 9. The joints are appropriately ball joints.

As can be seen from FIG. 1, the tension rod 12 is extended (downwardly) beyond its pivotal connection (joint 14) with the intermediate member 9 and one end of a strut 16 extending obliquely to the vehicle longitudinal direction L, as viewed in plan view, is pivotally connected (joint 17) at the thus formed extension 15; the strut 16 is pivotally connected with its other end at the merely schematically indicated vehicle body 19—by way of the joint 18.

The connections indicated in the drawing with the vehicle body 19 may also be completely or partly connections which are formed at an intermediate bearer or auxiliary frame or the like which in turn is connected with the vehicle body.

With a pivoting of the wheel 1 and of the wheel carrier 2 in the direction of the arrow 20 (FIGS. 1 and 4), the upper joint 13 of the tension rod 12 moves toward the outside and the lower joint 17 toward the inside relative to the intermediate member 9, as is also indicated by the movement arrow 21. However, as the extension 15 of the tension rod 12 is supported with ts joint 17 at the inclined strut 16, the pivot bearing 10 is displaced from the position shown in full lines in FIG. 4 into the position indicated in dash lines which, of course, also leads to a slight horizontal pivoting of the guide member 6 about the point of pivotal connection on the side of the body. The just described horizontal displacement of the pivot bearing 10 in conjunction with the pivoting of the wheel carrier 2 about the pivot bearing 10 leads in the steering arrangement schematically illustrated in FIG. 4 to a rotation of the wheel about the ideal center of rotation 22. The wheel therefore rotates about an ideal center which approaches considerably more closely the wheel center plane 23 than the actual pivot joints and joints within the area of the wheel carrier. This creates the necessary installation space in the wheel dish for the more largely dimensioned brakes. Furthermore, a small steering force lever arm which is desirable in particular with driven steerable wheels, and a small steering roll radius additionally with a small angle of steering axis inclination is possible. The moments resulting from the braking and driving are introduced into the vehicle body 19 essentially by the lower cross guide member 6 and the strut 16, i.e. on a large support base. The elasto-kinematics thereby depends far-reachingly from a single joint, namely the joint 18 and is easily controllable, also for the purpose of obtaining a good longitudinal spring action of the entire wheel suspension.

For that purpose the strut 16 is elastically yieldingly supported at the vehicle body 19 which can take place by the correct dimensioning and alignment of the rubber material of the joint 18.

According to FIGS. 1 and 4 the strut 16 extends rearwardly inwardly in the illustrated driven and steerable front wheel 1. This arrangement, in conjunction with the already described rotation of the wheel about the center of rotation 22 permits a relatively large deflection angle of the wheel 1 (FIG. 4) without having to fear that the tire contour approaches excessively the strut 16. The strut 16 gets out of the way, so to speak of, from the deflected wheel 1. These kinematics can be designed nearly at will by suitable selection of the lever arms of the tension rod 12.

As can be seen in FIG. 1, the strut 16 engages at an extended tension rod 12 located in front of the wheel axis 24, as viewed in the driving direction L.

According to the detailed illustration of FIG. 2, also a torsion-rigid lower cross guide member 6' may be provided for the wheel suspension in accordance with the present invention which has on a wide base two pivotal connections 25 and 26 on the body side. Such a lower cross guide member 6' can essentially alone absorb and transmit the moments resulting from the drive or braking of the wheel 1. However, one of the two pivotal connections on the side of the body—in the illustrated embodiment according to FIG. 2, to the rear pivotal connection 26—must be yielding in the vehicle transverse direction in order that the slight horizontal displacement of the lower cross guide member 6', already described hereinabove, about the other pivotal connection 25 on the side of the body is possible. This transversely yielding bearing support can be formed by a swinging or pendulum support 27 which extends at least approximately vertically and is pivotally connected, on the one hand, with the vehicle body 19 and, on the other, with the lower cross guide member 6'.

In the preferred embodiment according to FIG. 1, an approximately vertical support rod 28 is provided which is pivotally connected, on the one hand, with the upper cross guide member 4 intermediate the two pivotal connections 29 and 30 thereof and, on the other, with the strut 16 intermediate the broad based pivotal connections thereof (joints 17 and 18). By reason of the relatively large distance of the joint 17 of the strut 16 from the wheel axis 24 (FIG. 4)—as viewed in plan view—it is possible by means of the already mentioned support rod 28 to dispense with the torque transmission (driving and braking torques) by the lower cross guide member 6' and to transmit these moments to the strut 16 essentially over the relatively wide base a (FIG. 1). The advantages already mentioned hereinabove result therefrom that the vertical forces resulting from the moment transmission can be introduced into a rigid zone of the body. Furthermore, a more simple lower cross guide member 6 arranged exclusively in the transverse direction may thereby be used which is connected with the vehicle body 19 or the like by a single joint 31. By the correct selection of the lever arm ratios (base a, distance of support rod joint to the joint 30 of the upper cross guide member 4), a braking and starting pitching compensation can be achieved in the wheel suspension according to present invention, taking into consideration the teachings of the prior patent application No. P 33 31 247.

In the illustrated embodiments, it is assured that nearly identical force conditions will result at the points of pivotal connection on the frame side (joints 18 and 31; joints 25 and 26) for the load cases of braking respectively driving, as a result of which also the deformations and deformation directions of the elastic bearings for these pivotal connections will be similar and a completely satisfactory elasto-kinematic design becomes possible for both load conditions.

Finally, it can be seen from FIG. 1 that the pivotal connection 30 of the upper cross guide member 4 at the wheel carrier 2 must not be located on the extended axis 11 of the pivot bearing 10. As a result thereof, additional effects such as camber change and caster change over the steering deflection can be favorably influenced.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as known to those skilled in the art.

I claim:

1. A wheel suspension for steerable wheels of motor vehicles, comprising wheel carrier means supporting a wheel, a tie rod pivotally connected with the wheel carrier means, an upper cross guide means pivotally connected with the wheel carrier means, a lower cross guide means supporting a support spring, an intermediate member, said lower cross guide means being connected with said intermediate member by way of a pivot joint means having an essentially longitudinal axis of rotation, the wheel carrier means, being supported at the intermediate member by way of a pivot bearing means having an approximately vertical axis and vertical displaceability, an approximately vertical tension rod, the wheel carrier means and the intermediate member being pivotally connected with said tension rod, the tension rod being extended beyond its pivotal connection with the intermediate member, and strut means extending obliquely to the vehicle longitudinal direction, as viewed in plan view, the strut means being pivotally connected with one end at said extension and at the other end with a relatively fixed vehicle part.

2. A wheel suspension according to claim 1, wherein said fixed vehicle part is the vehicle body structure.

3. A wheel suspension according to claim 1, wherein the steerable wheels are driven front wheels.

4. A wheel suspension according to claim 1, wherein said strut means is elastically supported at said relatively fixed part.

5. A wheel suspension according to claim 4, wherein said strut means extends from the extension rearwardly inwardly at an inclination.

6. A wheel suspension according to claim 5, wherein said strut means engages at the extended tension rod which is located in front of the wheel axis, as viewed in the driving direction.

7. A wheel suspension according to claim 6, further comprising support rod means which is pivotally connected with the upper cross guide means intermediate the pivotal connections at the two ends thereof and with the strut means intermediate the pivotal connections at both ends thereof.

8. A wheel suspension according to claim 7, wherein the lower cross guide means is pivotally connected with the relatively fixed vehicle part by a single joint means.

9. A wheel suspension according to claim 7, in which the lower cross guide means is a torsion-resistant lower cross guide member which includes on a wide base two pivotal connecting means on the side of the relatively fixed part, one of the two pivotal connecting means being yielding in the vehicle transverse direction.

10. A wheel suspension according to claim 9, wherein the yieldingness in the vehicle transverse direction is formed by a swinging support means which is pivotally connected with the relatively fixed part and with the lower cross guide member.

11. A wheel suspension according to claim 1, in which the lower cross guide means is a torsion-resistant lower cross guide member which includes on a wide base two pivotal connecting means on the side of the relativley fixed part, one of the two pivotal connecting means being yielding in the vehicle transverse direction.

12. A wheel suspension according to claim 11, wherein the yieldingness in the vehicle transverse direction is formed by a swinging support means which is pivotally connected with the relatively fixed part and, with the lower cross guide member.

13. A wheel suspension according to claim 1, wherein said strut means extends from the extension rearwardly inwardly at an inclination.

14. A wheel suspension according to claim 13, wherein said strut means engages at the extended tension rod which is located in front of the wheel axis, as viewed in the driving direction.

15. A wheel suspension according to claim 1, further comprising support rod means which is pivotally connected, with the upper cross guide means intermediate the pivotal connections at the two ends thereof and with the strut means intermediate the pivotal connections at both ends thereof.

16. A wheel suspension according to claim 15 wherein the lower cross guide means is pivotally connected with the relatively fixed vehicle part by a single joint means.

* * * * *